United States Patent [19]

Geus et al.

[11] 4,190,560
[45] Feb. 26, 1980

[54] PROCESS FOR PREPARING CATALYST ON CARRIER SYSTEMS

[75] Inventors: John W. Geus; Leonardus A. M. Hermans, both of Utrecht, Netherlands

[73] Assignee: Stamicarbon, B.V., Geleen, Netherlands

[21] Appl. No.: 907,777

[22] Filed: May 19, 1978

Related U.S. Application Data

[63] Continuation-in-part of Ser. No. 894,612, Apr. 6, 1978, abandoned.

[30] Foreign Application Priority Data

| Apr. 6, 1977 | [NL] | Netherlands | 7703762 |
| Apr. 5, 1978 | [FR] | France | 78 10060 |
| Apr. 6, 1978 | [DE] | Fed. Rep. of Germany | 2814914 |
| Apr. 5, 1978 | [IT] | Italy | 48750A/78 |
| Apr. 5, 1978 | [JP] | Japan | 53-40163 |
| Apr. 3, 1978 | [GB] | United Kingdom | 12945/78 |

[51] Int. Cl.$^2$ .................... B01J 29/10; B01J 23/62
[52] U.S. Cl. .................... 252/459; 252/438; 252/454; 252/453; 252/466 J
[58] Field of Search .................... 252/438, 459, 466 J, 252/454, 463

[56] References Cited

U.S. PATENT DOCUMENTS

| 2,619,474 | 11/1952 | Gutzeit | 252/438 |
| 3,668,148 | 6/1972 | Van Beek et al. | 252/440 |
| 3,790,642 | 2/1974 | Kominami et al. | 252/438 X |

Primary Examiner—Carl F. Dees
Attorney, Agent, or Firm—Cushman, Darby & Cushman

[57] ABSTRACT

An improved process for the preparation of a particulate at least inchoately catalytically active composition affixed to the surfaces of a solid particulate carrier material. An aqueous medium is formed by homogeneously suspending a finely divided, solid particulate carrier material in an aqueous solution initially containing (a) a water soluble compound of a metal capable of forming the catalytically active composition which soluble compound, upon increase of the hydroxyl ion concentration in the aqueous medium will form a water insoluble compound, and (b) a hydrolyzable agent which upon heating will develop hydroxyl ions in the aqueous medium. The aqueous solution/suspension thus formed is heated with agitating so as to gradually and homogeneously increase the hydroxyl ion concentration thereby effecting the precipitation of the water insoluble compound on the carrier material. The carrier material, having said insoluble compound deposited thereon, is thereafter separated from the remaining aqueous solution, washed, dried and optionally calcined and/or reduced to form the catalytically active composition. The improvement lies in using as the hydrolyzable agent a compound which will form cyanate ions in the aqueous medium and heating the aqueous medium to a temperature of only between about 20° and 50° C. to hydrolyze the cyanate ions thereby, gradually and homogeneously raising the hydroxyl ion concentration within the aqueous medium.

14 Claims, 1 Drawing Figure

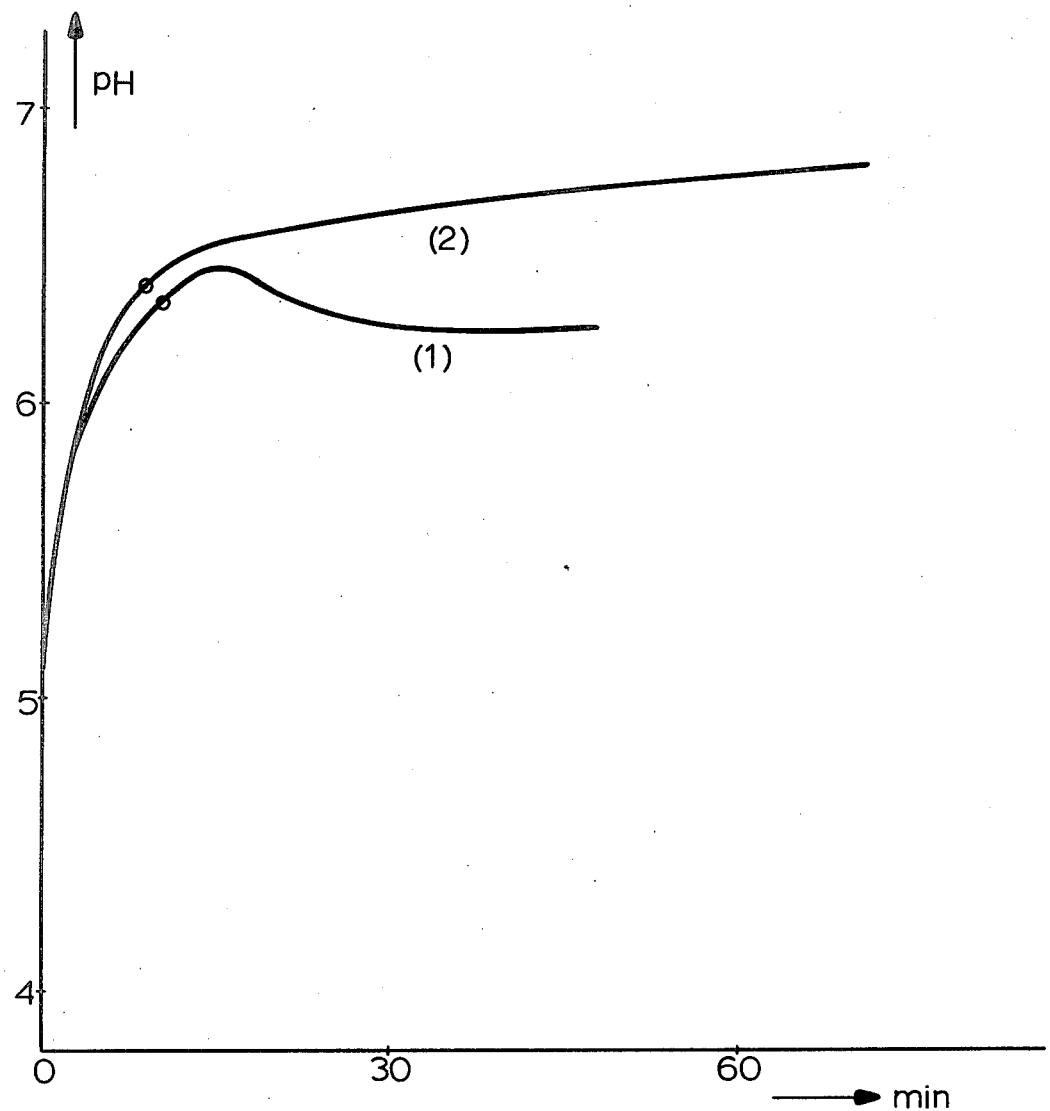

PROCESS FOR PREPARING CATALYST ON CARRIER SYSTEMS

This is a continuation-in-part of application Ser. No. 894,612 (Corresponding to Netherlands Appln. Ser. No. 7703762, filed Apr. 6, 1977) filed Apr. 6, 1978 and now abandoned.

It is known that excellent catalysts can be obtained by the precipitation of insoluble compounds of catalytically active metal ions from a homogeneous solution of soluble compounds of such metal onto a carrier material suspended in the solution. The precipitation is effected by gradually and uniformly raising the hydroxyl-ion concentration of the solution/suspension. The metal ions will then precipitate as hydroxides or hydrated oxides. If so desired, the hydroxides of hydrated oxides can be converted into the corresponding oxides by calcination, or converted into corresponding metals by reduction.

One of the most suitable means for gradually and uniformly raising the hydroxyl ion concentration is by the hydrolysis of urea as described, for instance, in German Pat. No. 1,767,202. The use of urea, however, presents sometimes some difficulties. These difficulties arise out of the fact that the rate of hydrolysis of urea is too slow for industrial use at temperatures lower than about 90° C. Even above 90° C. the precipitation time is relatively extended. To precipitate the metal-ions substantially completely asks for periods of the order of 15 to 20 hours, which leads to a relative low rate of production. In U.S. Pat. No. 3,668,148 it has therefore already been proposed to carry out the hydrolysis at temperatures above 100° C. at elevated pressure.

At temperatures of about 90° C. or above, furthermore, certain metal-carrier combinations, such as nickel and silica, in contrast to e.g. tin or chromium (III) and silica, display an extend of reaction beyond the surface-layer of the support. In such instances, part or even all of the carrier material, depending on the degree of loading with metal ions, may be converted into a hydrosilicate of the metal concerned. Generally only the metal or the metal-oxide is catalytically active. The hydrated oxide or hydroxide precipitated on the surface of the carrier can be converted relatively easily into the corresponding metal by reduction, or the metal-oxide by calcination. With hydrosilicate these conversions are more difficult; generally an appreciably higher temperature is required to decompose the hydrosilicates into silica and the corresponding metal or metal-oxide.

To decompose a considerable fraction of the hydrosilicate into silica and metal or metal-oxide particles calls for relatively high temperatures and extended periods to decompose the main fraction of the hydrosilicate into metal particles and silica. Reduction at temperatures of from about 400° to 700° C. is required during 50 to 200 hours. Where the degree of loading of the catalytically active metal is 50% by weight or more, as is technically desirable, this formation of metal particles from the metal hydrosilicate generally results in an average particle size of from about 30 to 100 Å.

Similarly, to form a catalytically active metal oxide from the metal hydrosilicate, calcination of the loaded carrier material at temperatures of from about 400° to 900° C. is generally required during 50 to 200 hours. This results in an average particle size of the resulting metal oxide, for a degree of loading of 50% by weight or more, of from about 30 to 100 Å.

The pore structure of heterogeneous catalysts is generally of great importance to the effectiveness of the catalyst. The catalytically active surface must be readily accessible to reactants, while at the same time the reaction products must be discharged rapidly.

In the production of carrier materials such as silica and alumina, the resulting pore structure can well be controlled. Naturally, this structure must not be impaired when the catalytically active composition is applied. However, when the catalytically active composition is applied at a high degree of loading, using urea as the hydrolyzable agent, impairment of this pore structure cannot always be avoided as exemplified above. This drawback has also been recognized in the published Netherlands Patent Application No. 6,919,618. It has therefore been proposed to effect the precipitation at 10° to 50° C., preferably at room temperature, by raising the pH of the solution/suspension by means of an organic base that is virtually immiscible with the solution of the metal salt. Examples of suitable organic bases are: n-octyl amine and n-octadecyl amide, and similar compounds.

However, excessive mechanical energy is required in such a process to establish a sufficiently large area of contact between the two immiscible liquids. Furthermore, the organic bases are comparatively expensive and, in addition, an emulsion is often formed making it difficult to separate the loaded supporting carrier material from the liquid. This necessitates the addition of organic solvents, such as benzene or chloroform.

It is therefore the object of the present invention to improve upon the above-mentioned processes by providing a method for the preparation of a catalyst system comprised of an at least inchoately catalytically active composition affixed to the surface of a particulate carrier material, whereby small catalytically active metal or active metal-oxide particles can be produced at a higher rate of production and using lower reduction or calcination temperatures than under, for example, the above-mentioned German Pat. No. 1,767,202. A further object is avoiding at the same time impairment of the pore structure of the carrier material, and additionally avoiding the above-mentioned difficulties and costly chemicals of the process of Netherlands Patent Application No. 6,919,618.

According to the invention it has been found that by utilizing the hydrolysis of cyanate ions at a temperature of between 20° and 50° C. to produce the necessary increase in hydroxyl ions in the aqueous medium, the above objects can be achieved. This hydrolysis proceeds according to the equation:

$$3 H_2O + CNO^- \rightarrow NH_3^+ + CO_2 + 2 OH^-$$

Above reaction occurs at a measurable rate at temperatures as low as 5° C., but for industrial application, temperatures of between about 30° and 45° C. are preferable. This allows to complete the precipitation within about 3 hours.

Any compound capable of forming cyanate ions in the aqueous medium may be used, provided such compound does not introduce materials deleterious to the precipitation or the catalyst to be produced. However, use is preferably made of alkali or ammonium cyanates. The amount of cyanate initially present must be at least the stoichiometric amount required to transform substantially all of the water soluble metal compound in the aqueous medium into the water insoluble compound.

The precipitation process will be completed more rapidly if an excess of cyanate is present, such as an amount up to ten times the stoichiometric amount. Most generally though an amount of cyanate of from two to four times the stoichiometric amount will give a sufficiently rapid and complete precipitation.

When finely divided, highly porous silica or alumina are preferably used as the carrier material, the advantages of the process are particularly significant in the preparation of catalysts in which the catalytically active composition includes compounds (oxides), metals or alloys of one or more of the elements nickel, cobalt, iron, and copper, either alone or in combination with each other or with other metals. However, advantages are also realized when other carrier materials, such as $TiO_2$, and many others, are used. This is especially true with the production of nickel on alumina catalysts, that are of great industrial importance.

The catalytically active metal ions may be put in the aqueous solution as nitrates, chlorides, or sulphates, or other readily soluble compounds. In addition, the soluble cyanate of the catalytically active metal may be used. The optimum concentration of metal ions in the aqueous solution depends primarily upon the desired degree of loading of the metal ion on the supporting carrier material. To obtain a high degree of loading, the solution may without objection, contain, for instance, up to 15% by weight of metal ions.

The process of the invention is carried out by putting the required components in water at a temperature below 20° C. After homogenization of the solution/suspension, the temperature is raised to a level whereat the hydrolysis reaction starts to proceed. By controlling the temperature of the aqueous medium the rate of hydrolysis, and thus the rate of precipitation, can very closely be controlled. To avoid nucleation and precipitation in the bulk of the solution at the considerably higher rate of precipitation than obtained with the hydrolysis of urea, small (conglomerates of) particles of the support must be used. Completion of the precipitation within about 2 hours calls for particles of the support in a size of less than 10 microns, preferably less than 5 microns, e.g. one micron.

In carrying out the invention, the carrier material, after being loaded, is preferably separated from the remaining liquid as quickly as possible, washed and dried. Even at temperatures below 50° C., hydrosilicates are formed in the presence of water, although rather slowly. For this reason the loaded carrier material is preferably dried at the lowest possible temperature, which is accomplished most effectively at reduced pressure, that is under a partial vacuum.

According to the invention the degree of loading of the support with catalytically active material can be raised considerably above 50% by weight of the weight of the finished catalyst. The size of the active particles depends of said degree of loading. Above 50% by weight, the mean size of the active particles is still less than 200 Å; with carriers of an elevated specific surface area from about 200 $m^2/g$ to 750 $m^2/g$ (e.g. 500 $m^2/g$) a mean particle size of the order of 50 Å and less can be maintained even after prolonged use at temperatures of the order of 500° to 600° C. The surface area of the loaded support is not smaller than that of the starting material.

The invention will be illustrated by the following Examples wherein nickel catalysts are prepared on a silica and on alumina carrier material. These materials are used for illustrative purposes only, and it should be understood that other metals and other carrier materials as described above can equally well be applied in the process of the present invention.

EXAMPLE 1

37 grams of $Ni(NO_3)_2 \cdot 6 H_2O$ and 20 grams of KCNO were dissolved in 900 ml of distilled water at a temperature of 15° C. Next, 7.64 grams of silica (Trade name AEROSIL 380 V) with a surface area of about 400 $m^2/g$ were suspended in the solution. The temperature of the homogeneous solution/suspension was then adjusted to 37° C. with constant vigorous agitation. The change in the pH value of the solution is shown in the FIGURE. In this FIGURE, the horizontal axis shows the time in minutes and the vertical axis the pH value of the solution. Curve (1) shows the change of the pH value as a function of time at 37° C., the temperature used in the Example.

The precipitation commenced after about 10 minutes at a pH value of 6.3 (determined by light-scattering). After about 90 minutes all of the nickel initially present had precipitated onto the carrier material. This appeared from the fact that a filtered sample of the solution no longer contained any nickel. Next, the loaded carrier material was immediately filtered off and washed. Filtering and washing took about 15 minutes. The residue was then placed in a vacuum drier. After 3 hours the temperature was raised to 40° C., and after 6 hours it was adjusted to 120° C.

The same experiment was repeated, but without the addition of the silica carrier material. The change in the pH value is shown in the FIGURE by curve (2). Precipitation commenced after 8 minutes at a pH value of 6.45. The fact that the precipitation now takes place at a higher pH value indicates that the solubility of the resulting nickel hydroxide in the experiment using the carrier material was lower owing to its interaction with the carrier material. Consequently, precipitation could take place only onto the carrier material.

The pore distribution of the dried, cooled carrier materials was determined by capillary condensation of nitrogen. The material was found to contain only micropores (dimensions 20 Å). After reduction in flowing hydrogen gas for 48 hours at 350° C., the catalyst contained metal particles of nickel of about 20 Å, as determined by electronmicroscopy.

EXAMPLE 2 (not according to the invention)

A nickel catalyst on silica was prepared by a method analogous to Example 1, except that the precipitation was effected at 90° C. by means of urea, which took about 20 hours. The carrier material after the precipitation was found to obtain only slotted pores with dimensions of between 30 and 400 Å. Examination in an electron microscope disclosed that the carrier material had been converted fully into plate-shaped nickel-hydrosilicate crystallites. Substantial reduction of this catalyst required a temperature of 500° C. during 72 hours. The dimensions of the resulting nickel particles were about 60 Å.

Although this catalyst has drawbacks in comparison to a catalyst according to the invention especially with respect to the preparation time and pore structure, the catalyst has a sufficient activity and thermal stability for some reactions. Prolonged use for the decomposition of ammonia at temperatures up to 700° C. did not bring about a considerable growth of the nickel particles.

EXAMPLE 3

In another experiment the same carrier material was loaded with the same amount of nickel by the process of the invention. But after completion of the precipitation the suspension was kept for 20 hours at 37° C. The acid solubility of the loaded carrier material showed that a considerable amount of nickel hydrosilicate had formed.

EXAMPLE 4

9.924 grams of $Ni(NO_3)_2 \cdot 6 H_2O$ and 5.536 grams of KCNO two times the stoechiometric amount were dissolved in 3 litres of distilled water at a temperature of 15° C. Subsequently 4.675 grams of alumina (Harshaw, Al 1401 P), with a relatively small surface area of 180 $m^2/g$ were suspended in the solution. With vigorous agitation the temperature of the homogenous solution/suspension was adjusted to 37° C. The pH-value was 5,9 and remained during precipitation at this value. After about 180 min. all the dissolved nickel had precipitated on the support. A filtered sample in the solution did not show a marked content of nickel. The loaded carrier was immediately filtered off, washed and dried for 17 hours at 120° C. After calcination in nitrogen at 300° C. reduction was carried out in flowing hydrogen at 350° C. for 50 hours.

The size distribution of the nickel particles in the reduced material was derived from magnetic measurements. The distribution was centered around a particle size of 30 Å and dit no extend beyond the size of 60 Å. The reduced material contained 30% by weight Ni, relative to the total weight. Reduction at 400° C. did not show a considerable increase of the nickel particle size.

What is claimed is:

1. In a process for the preparation of a particulate, at least inchoately catalytically active composition affixed to the surface of a finely divided solid particulate carrier material by the steps of forming an aqueous medium initially containing said carrier material homogeneously suspended in an aqueous solution of
at least one water soluble compound of at least one metal capable of forming said catalytically active composition, which will form a water insoluble compound of said metal upon an increase of the hydroxyl ion concentration in said aqueous medium, and a hydrolzable agent which upon heating will develop hydroxyl ions in said aqueous medium, heating and stirring said aqueous medium so as to gradually and homogeneously increase the hydroxyl ion concentration throughout said aqueous medium thereby effecting the precipitation of said water insoluble compound substantially homogeneously onto said carrier material, separating said carrier material, having said water insoluble compound deposited thereon, from the remaining aqueous solution of said aqueous medium, the improvement wherein said carrier material has a particle size of less than 10 microns, said hydrolyzable agent is a compound forming cyanate ions in said aqueous medium, and said aqueous medium, initially formed at a temperature of less than about 20° C., is heated to a temperature of between about 20° C. and 50° C. to hydrolyze said cyanate ions thereby gradually and homogeneously raising the hydroxyl ion concentration within said aqueous medium.

2. The process of claim 1, wherein said aqueous medium is heated to a temperature of between about 30° C. and 45° C.

3. The process of claim 1, wherein said hydrolyzable agent is an alkali or ammonium cyanate.

4. The process of claim 1, wherein the amount of cyanate ion initially present in said aqueous medium is 1 to 10 times the quantity required to transform substantially all of said water soluble compound initially present in said aqueous medium into said water insoluble compound.

5. The process of claim 4, wherein the amount of cyanate ion initially present in said aqueous medium is 2 to 4 times the quantity required to transform substantially all of said water soluble compound initially present in said aqueous medium into said water insoluble compound.

6. The process of claim 1, wherein said carrier material is a finely divided, highly porous silica or alumina, and said catalytically active composition includes at least one member selected from the group consisting of the elements nickel, cobalt, iron or copper, oxides of such elements, or any combination with each other or with other metals.

7. The process of claim 1, wherein said separated carrier material, having said insoluble compound deposited thereon, is washed and dried and thereafter calcined at a temperature of between about 200° and 500° C., thereby forming a metal oxide as such catalytically active composition.

8. The proces of claim 1, wherein said separated carrier material, having said insoluble compound deposited thereon, is washed and dried and thereafter reduced at a temperature less than 500° C., thereby forming a metal as such catalytically active compound.

9. The process of claim 1, wherein said water soluble compound of a metal is selected from the group consisting of soluble nitrates, chlorides and sulfates of said metal.

10. The process of claim 1, wherein said aqueous solution initially contains up to 15% by weight of ions of said at least one metal.

11. The process of claim 1, wherein said water soluble compound of a metal is a soluble cyanate of said metal.

12. The process of claim 1, wherein said carrier material has a particle size of less than 5 microns and a specific surface from about 200 $m^2/g$ to 750 $m^2/g$.

13. The process of claim 1, wherein said carrier material, having said insoluble compound deposited thereon, is washed and thereafter dried at a pressure of less than atmospheric pressure.

14. A particulate catalytically active composition affixed to the surface of a solid particulate carrier material produced in accordance with the improved process of claim 1.

* * * * *